United States Patent Office 3,794,556
Patented Feb. 26, 1974

3,794,556
PRIMER COMPOSITION FOR ADHERING SILICONE ELASTOMER TO SUBSTRATES
Donald G. Young, Glendale, Ky., assignor to Dow Corning Corporation, Midland, Mich.
No Drawing. Application Dec. 30, 1970, Ser. No. 103,004, now Patent No. 3,671,483, which is a continuation-in-part of abandoned application Ser. No. 30,346, Apr. 20, 1970. Divided and this application Jan. 31, 1972, Ser. No. 222,401
Int. Cl. B32b 25/20
U.S. Cl. 161—206   2 Claims

ABSTRACT OF THE DISCLOSURE

A mixture of tetraalkoxysilane or partial hydrolyzate thereof, a tetraalkyltitanate, a compound of the formula $CF_3CH_2CH_2Si[OSi(CH_3)_2X]_3$ where X is a hydrogen atom or $-CH_2CH_2Si(OOCCH_3)_3$ and at least one X is a $-CH_2CH_2Si(OOCCH_3)_3$ and an organic solvent is useful as a primer in adhering silicone elastomer to substrates such as epoxy resins and polyurethane. An example of the primer is one part each of ethylpolysilicate, tetrabutyltitanate and $$CF_3CH_2CH_2Si[OSi(CH_3)_2CH_2CH_2Si(OOCCH_3)_3]_3$$

and ten parts of acetone.

---

This is a division of application Ser. No. 103,004, filed Dec. 30, 1970, now U.S. Pat. No. 3,671,483, which application is a continuation-in-part of application Ser. No. 30,346, filed Apr. 20, 1970, now abandoned.

This invention relates to a primer composition. More specifically, a primer composition to adhere silicone elastomer to substrates such as epoxy resin and polyurethane.

Silicone elastomers have many properties which make them desirable for use in construction applications of buildings and transportation vehicles, for example. However, the silicone elastomers do not have, in many instances, the necessary adhesion to many construction materials. Therefore, it is an object of the present invention to provide a primer composition for enhancing the adhesion of silicone elastomers to substrates.

This invention relates to a composition consisting essentially of a mixture of 1 part by weight of an alkoxy silicon compound selected from the group consisting of tetraethoxysilane, tetrapropoxysilane, polyethylsilicate, polypropylsilicate and mixtures thereof, from 0.75 to 2.5 inclusive parts by weight of a titanate selected from the group consisting of tetraalkyltitanate in which the alkyl group has from 3 to 5 inclusive carbon atoms per alkyl group and bis(acetylacetonyl)diisopropyltitanate, from 0.75 to 5 inclusive parts by weight of an organosilicon compound of the formula $CF_3CH_2CH_2Si[OSi(CH_3)_2X]_3$ in which each X is a monovalent radical selected from the group consisting of a hydrogen atom and a $$-CH_2CH_2Si(OOCCH_3)_3$$

and at least one X is a $-CH_2CH_2Si(OOCCH_3)_3$, and from 1 to 20 inclusive parts by weight of an organic solvent having a boiling point no greater than 150° C. and selected from the group consisting of ketones, hydrocarbons and halogenated hydrocarbons.

The alkoxy silicon compounds are well known compounds and can be purchased commercially including tetraethoxysilane, tetrapropoxysilane, polyethylsilicate and polypropylsilicate. The polyethylsilicate and polypropylsilicate can be any of the silicates which are soluble in the ketone solvents.

The tetraalkyltitanates can be any tetraalkyltitanate having an alkyl group of 3 to 5 inclusive carbon atoms. Examples of such titanates include, tetraisopropyltitanate, tetra-n-propyltitanate, tetrabutyltitanate, tetraamyltitanate and dibutyldiisopropyltitanate. The tetraalkyltitanates and bis(acetylacetonyl)diisopropyltitanate are commercially available materials.

The organosilicon compound of the formula $$CF_3CH_2CH_2Si[OSi(CH_3)_2X]_3$$

where X is a hydrogen atom or a $$-CH_2CH_2Si(OOCCH_3)_3$$

radical and at least one X is a $-CH_2CH_2Si(OOCCH_3)_3$ radical, can be prepared by mixing $$CF_3CH_2CH_2Si[OSi(CH_3)_2H]_3$$

and vinyltriacetoxysilane in the mole ratios to give the desired final product, in the presence of a platinum catalyst, such as chloroplatinic acid. The mixture is then heated for about one hour at 100° C. When all the X are $-CH_2CH_2Si(OOCCH_3)_3$, it is desirable to use an excess of vinyltriacetoxysilane to insure complete reaction and high yields of product. The organosilicon compound can be

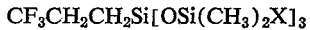

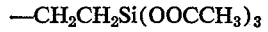

or mixtures thereof.

The organic solvent having a boiling point no greater than 150° C. includes ketones such as acetone, methylethylketone, methylisobutylketone, methylpropylketone, diethylketone, methyl-n-butylketone, ethylpropylketone, dipropylketone and butylethylketone, hydrocarbons such as hexane, pentane, heptane, octane, light naphthas, and benzene, and halogenated hydrocarbons such as chlorothene, carbon tetrachloride, trichloroethylene, perchloroethylene, monochlorobenzene and trichlorotrifluoroethane.

The compositions having the best priming properties are prepared from tetrabutyltitanate and polyethylsilicate and from bis(acetylacetonyl)diisopropyltitanate. The most desirable solvents are acetone, methylisobutylketone and light naphthas.

Basing the composition on one part by weight of alkoxy silicon compound, the tetraalkyltitanate and the bis-(acetylacetonyl)diisopropyltitanate can be present in an amount from 0.75 to 2.5 inclusive parts by weight, preferably 1 to 2 parts by weight, the organosilicon compound can be present in an amount from 0.75 to 5 inclusive parts by weight, preferably from 1 to 3 inclusive parts by weight and the organic solvent can be present in an amount from 1 to 20 inclusive parts by weight, preferably from 5 to 15 inclusive parts by weight.

The composition is best prepared by mixing the titanate and organic solvent and thereafter adding the remaining ingredients. However, the order of mixing the ingredients is not critical. The ingredients can be mixed at either room temperature or higher temperatures, such as the reflux temperature of the mixture. The composition of this invention should be prepared and stored under anhydrous conditions, since the ingredients are moisture sensitive.

The composition of the present invention is particularly useful as a primer in adhering silicone elastomers to substrates. Execellent adhesion is obtained when epoxy resin and polyurethane substrates are primed with the composition of the present invention and a room temperature vulcanizable silicone rubber based on poly-3,3,3-trifluoropropylmethylsiloxane is applied over the primed surface. The silicone elastomers are well known in the art and the methods of curing the silicone elastomers are particularly well known in the art and include for example the cross-linking by silicon-bonded hydrogen atoms with silicon-bonded vinyl radicals in the presence of a platinum catalyst. An integral combination of a cured room temperature vulcanizable silicone rubber and a substrate having the defined composition described above at the interface therebetween forms a combination which has stable adhesion once the silicone rubber is cured at room temperature.

The following examples are for illustrative purposes and should not be construed as limiting the present invention which is properly delineated in the claims.

EXAMPLE 1

(A) One mole of $CF_3CH_2CH_2Si[OSi(CH_3)_2H]_3$, which was prepared by hydrolyzing a mixture of dimethylchlorosilane and 3,3,3-trifluoropropyltrichlorosilane as further described in Example 1 of U.S. Pat. No. 3,344,160 which is hereby incorporated by reference, and one mole of vinyltriacetoxysilane in the presence of a chloroplatinic acid catalyst was heated for one hour at 100° C. The resulting product was

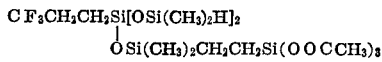
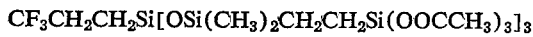

(B) The procedure of (A) above was repeated using four moles of vinyltriacetoxysilane instead of one mole. The resulting product was $$CF_3CH_2CH_2Si[OSi(CH_3)_2CH_2CH_2Si(OOCCH_3)_3]_3$$

(C) A composition was prepared by mixing for one hour 10 parts by weight of acetone and one part by weight of tetrabutyltitanate. To this mixture, one part of polyethylsilicate and one part of the product from A above was added. The resulting mixture was then brushed on substrates (panels) which had been cleaned with methylisobutylketone. The substrates were titanium metal, epoxy resin and polyurethane. The primed substrates were allowed to air dry for one hour at room temperature. A room temperature vulcanizable silicone rubber based on poly - 3,3,3 - trifluoropropylmethylsiloxane and curable through silicon-bonded hydrogen atoms and silicon-bonded vinyl radicals in the presence of a platinum catalyst was applied over the primed surfaces and allowed to cure for 5 days at room temperature. The silicone rubber was then peeled off of the test panels after several time intervals. The amount of cohesive failure was observed. After 14 days at room temperature, the silicone rubber still failed 100% cohesively; after 6 days immersion in jet fuel vapors at 200° F., the silicone rubber still failed 100% cohesively, and after 4 days at 450° F., dry heat, the silicone rubber still failed 100% cohesively. The results were the same on titanium, epoxy resin and polyurethane.

(D) The same formulation and procedure as described in (C) above were repeated except the product of (B) above was used in place of the product of (A). The cured silicone rubber still failed 100% cohesively after 28 days at room temperature. The cured silicone rubber still failed 100% cohesively both after 6 days immersion in jet fuel at 200° F. and after two cycles where one cycle was a 48 hour immersion in jet fuel at 180° F. followed by 4 days in jet fuel vapor at 450° F. The cured silicone rubber still failed 100% cohesively after 14 days in dry air at 450° F. The results were the same on titanium, epoxy resin and polyurethane.

(E) Equivalent adhesive results as obtained in (C) were obtained when 0.9 part by weight of the product of (A) above was used and ten parts by weight of acetone was added thereto followed by one part of polyethylsilicate and one part of tetrabutyltitanate and when the resulting composition was used as a primer as described in (C).

(F) Adhesive properties equivalent to those obtained in (D) above were obtained when (D) was repeated except tetraisopropyltitanate was used in place of the tetrabutyltitanate.

(G) Adhesive properties equivalent to those obtained in (D) above were obtained when two parts by weight of tetrabutyltitanate was used in place of one part by weight tetrabutyltitanate.

(H) Equivalent adhesive results as obtained in (D) above were obtained when tetraethoxysilane replaced the polyethylsilicate and the resulting composition was used as a primer as described in (D) above.

(I) Adhesive properties equivalent to those obtained in (C) above were obtained when (C) was repeated using either 3 parts by weight or 5 parts by weight of the resulting product of (A) above in preparing the compositions used as a primer.

(J) The procedure of (C) above was repeated except no primer was used. The cured silicone rubber failed 100% cohesively initially and after long periods of cure. The peel strength was very low and the silicone rubber could be peeled from the substrates with little effort.

(K) A composition was prepared by mixing for one hour, 10 parts by weight acetone and one part by weight of bis(acetylacetonyl)diisopropyltitanate. One part of polyethylsilicate and one part of a product prepared as described in (A) except two moles of vinyltriacetoxysilane was used in place of one mole providing a product of the formula

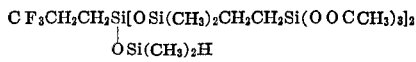

was added to the acetone mixture. The resulting mixture was brushed on two titanium panels which had been cleaned with methylisobutylketone. The primed titanium panels were allowed to air dry at room temperature for 30 minutes and one hour respectively. A room temperature vulcanizable silicone rubber as described in (C) was applied and cured by heating the panel, which had been dried for 30 minutes, at 70° C. for two hours and allowing the panel, which had been dried for one hour, to cure by exposure to ambient conditions for 72 hours. The silicone rubber was then peeled off the test panels. Each panel failed 100% cohesively.

(L) A composition was prepared as described in (K) except in place of the 10 parts by weight of acetone, 9 parts by weight of light naphtha and 1 part by weight of methylisobutylketone was used. The adhesive results were equivalent when the composition was used as described in (K).

EXAMPLE 2

Excellent adhesion is obtained when the following compositions are used as primers as described in Example 1, (C). All parts are parts by weight unless otherwise stated.

(A)

1 part of polyethylsilicate
1 part of tetrabutyltitanate
1 part of

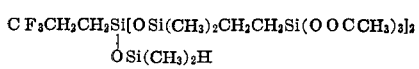

20 parts of methylisobutylketone (B)

1 part of polypropylsilicate
0.75 part of tetraamyltitanate
2 parts of a mixture of $CF_3CH_2CH_2Si[OSi(CH_3)_2H]_2$
   $OSi(CH_3)_2CH_2CH_2Si(OOCCH_3)_3$ and

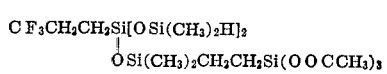

15 parts of diethylketone.

(C)

1 part of tetra-propoxysilane
2.5 parts of tetrabutyltitanate
3 parts of the product of Example 1, (B)
1 part of methylethylketone.

(D)

1 part of polyethylsilicate
1 part of tetrabutyltitanate
0.75 part of the product of Example 1, (B)
5 parts of butylethylketone.

(E)

1 part of polyethylsilicate
1 part of bis(acetylacetonyl)diisopropyltitanate
1 part of

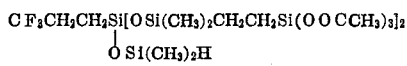

$\underset{\underset{\text{O Si(CH}_3)_2\text{H}}{|}}{\text{CF}_3\text{CH}_2\text{CH}_2\text{Si}[\text{O Si(CH}_3)_2\text{CH}_2\text{CH}_2\text{Si}(\text{O O CCH}_3)_3]_2}$ 10 parts of perchloroethylene.

That which is claimed is:

1. An integral combination of a cured room temperature vulcanizable silicone rubber bonded to a substrate having a residue from a composition at the interface between the cured room temperature vulcanizable silicone rubber and the substrate being selected from the group consisting of titanium metal, epoxy resin and polyurethane, wherein said composition as applied consists essentially of a mixture of 1 part by weight of an alkoxy silicon compound selected from the group consisting of tetraethoxysilane, tetrapropoxysilane, polyethylsilicate, polypropylsilicate and mixtures thereof, from 0.75 to 2.5 inclusive parts by weight of a titanate selected from the group consisting of tetraalkyltitanate in which the alkyl group has from 3 to 5 inclusive carbon atoms per alkyl group and bis(acetylacetonyl)diisopropyltitanate, from 0.75 to 5 inclusive parts by weight of an organosilicon compound of the formula $CF_3CH_2CH_2Si[OSi(CH_3)_2X]_3$ in which each X is a monovalent radical selected from the group consisting of a hydrogen atom and a —$CH_2CH_2Si(OOCCH_3)_3$ and at least one X is a —$CH_2CH_2Si(OOCCH_3)_3$, and from 1 to 20 inclusive parts by weight of an organic solvent having a boiling point no greater than 150° C. and selected from the group consisting of ketones, hydrocarbons and halogenated hydrocarbons.

2. The integral combination in accordance with claim 1 in which the substrate is selected from the group consisting of epoxy resin and polyurethane.

References Cited
UNITED STATES PATENTS

| | | | |
|---|---|---|---|
| 3,677,998 | 7/1972 | Young | 260—33.65 B |
| 3,377,309 | 4/1968 | Harper | 260—32.8 |
| 3,455,762 | 7/1969 | Harper | 156—315 |
| 3,519,465 | 7/1970 | Lyles | 117—47 |
| 3,619,256 | 11/1971 | Pepe et al. | 117—75 |
| 3,667,993 | 6/1972 | Stevenson | 117—72 |
| 3,642,936 | 2/1972 | Hodge et al. | 260—827 |
| 3,687,882 | 8/1972 | Bishop | 260—29.2 M |
| 3,714,109 | 1/1973 | Matherly et al. | 260—32.85 B |
| 3,689,454 | 9/1972 | Smith et al. | 260—45.5 G |

GEORGE F. LESMES, Primary Examiner

W. R. DIXON, JR., Assistant Examiner

U.S. Cl. X.R.

161—207, 208

Disclaimer 3,794,556.—*Donald G. Young*, Glendale, Ky. PRIMER COMPOSITION FOR ADHERING SILICONE ELASTOMER TO SUBSTRATES. Patent dated Feb. 26, 1974. Disclaimer filed July 25, 1973, by the assignee, *Dow Corning Corporation*.

Hereby disclaims the portion of the term of the patent subsequent to July 18, 1991.

[*Official Gazette May 28, 1974.*]